Oct. 11, 1932.  J. H. GENTRY  1,881,470
TWO-ROW CORN PICKER
Filed Feb. 18, 1929  6 Sheets-Sheet 1

INVENTOR,
John H. Gentry,
By Minturn & Minturn,
Attorneys.

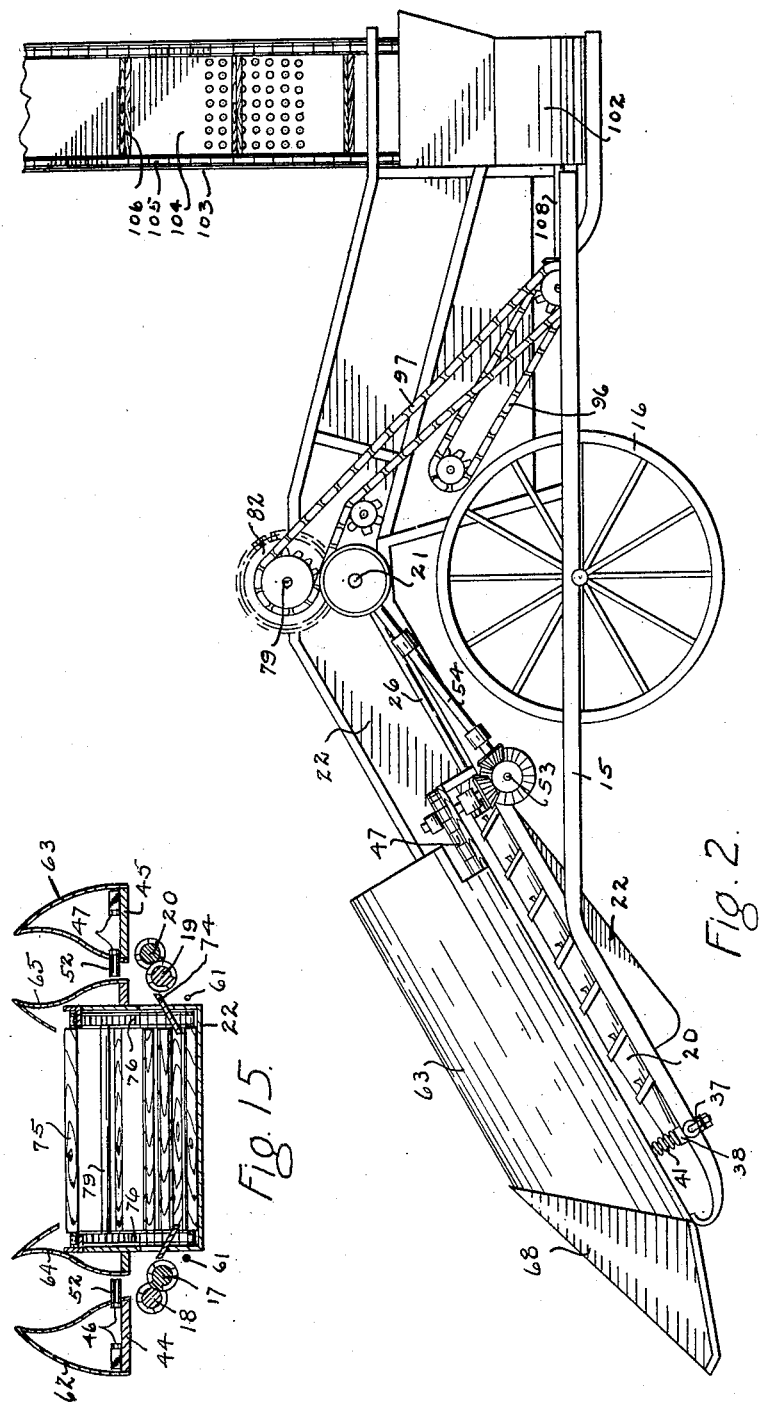

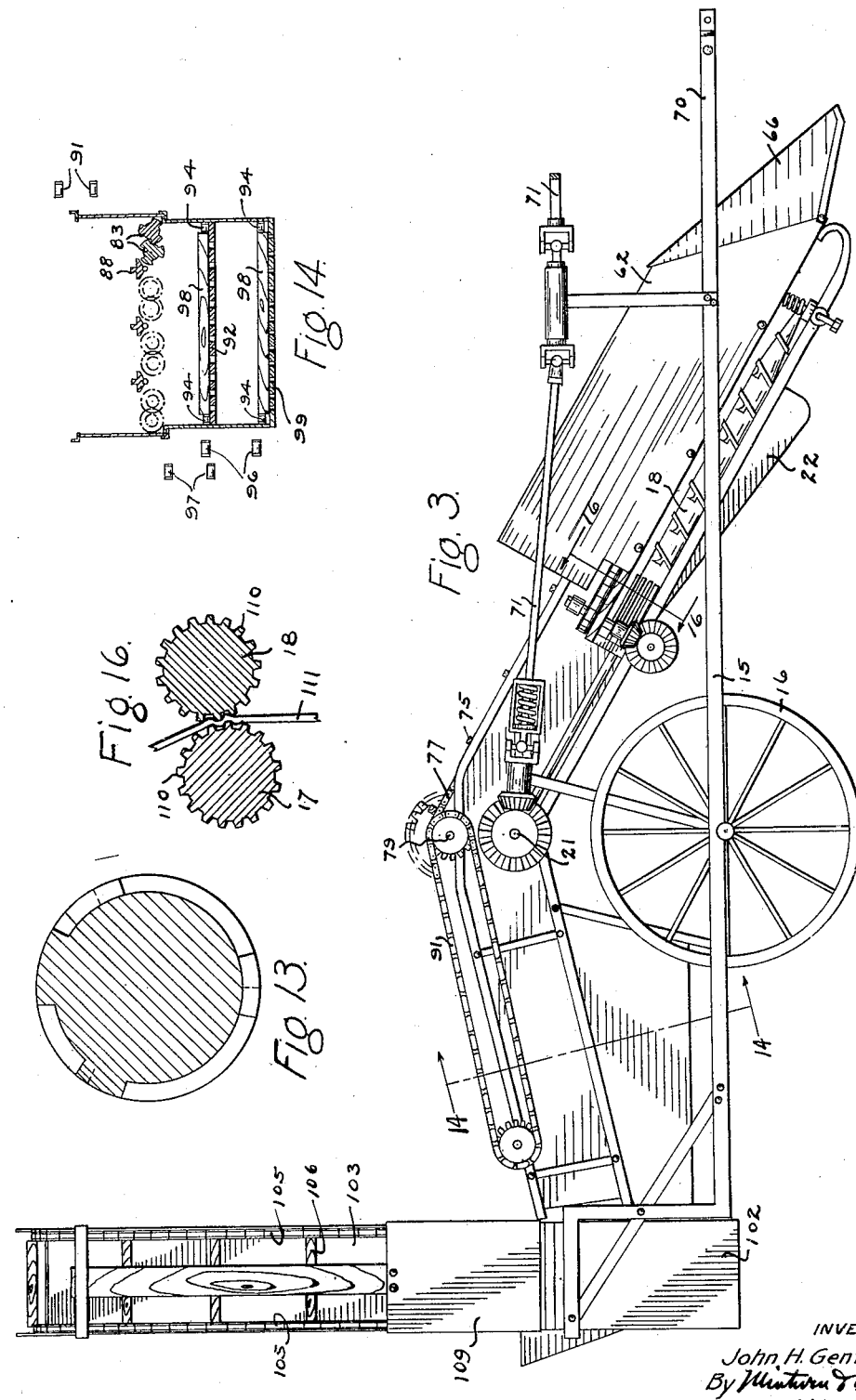

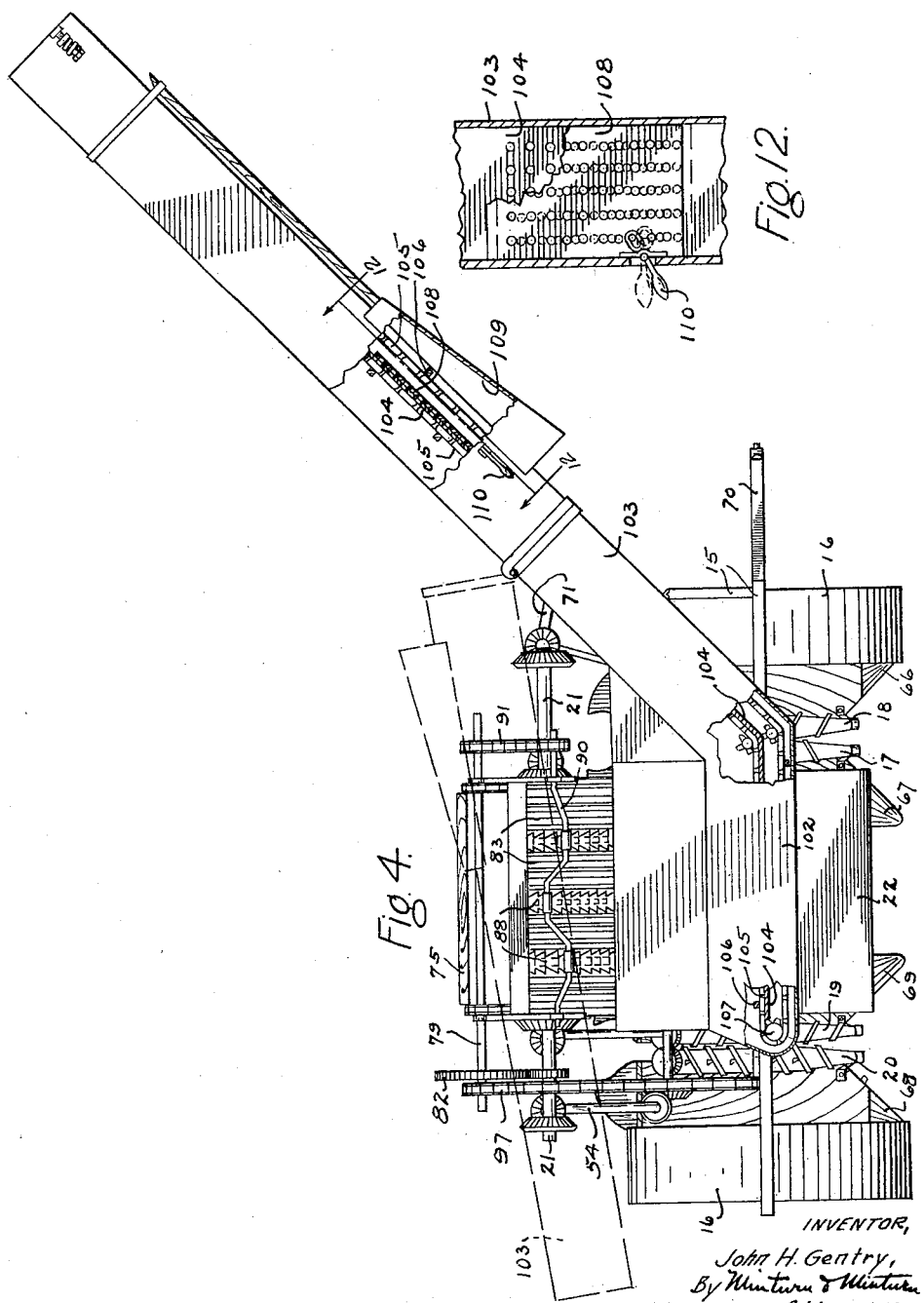

Oct. 11, 1932.  J. H. GENTRY  1,881,470
TWO-ROW CORN PICKER
Filed Feb. 18, 1929  6 Sheets-Sheet 5

INVENTOR,
John H. Gentry,
By Minturn & Minturn,
Attorneys.

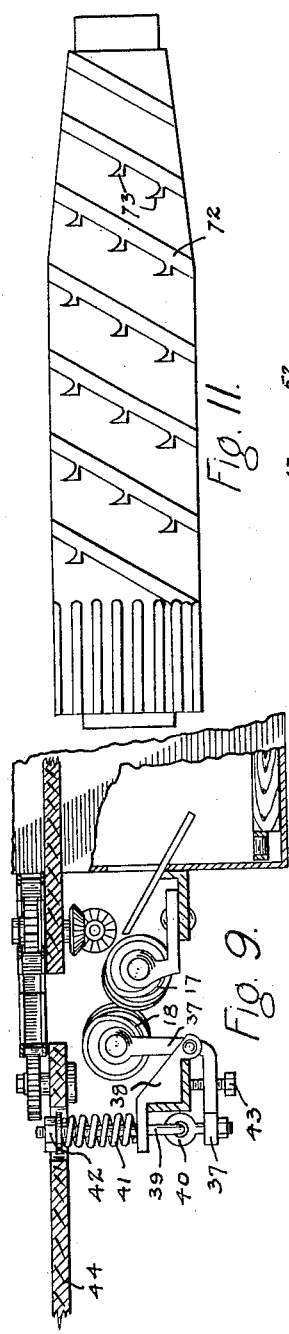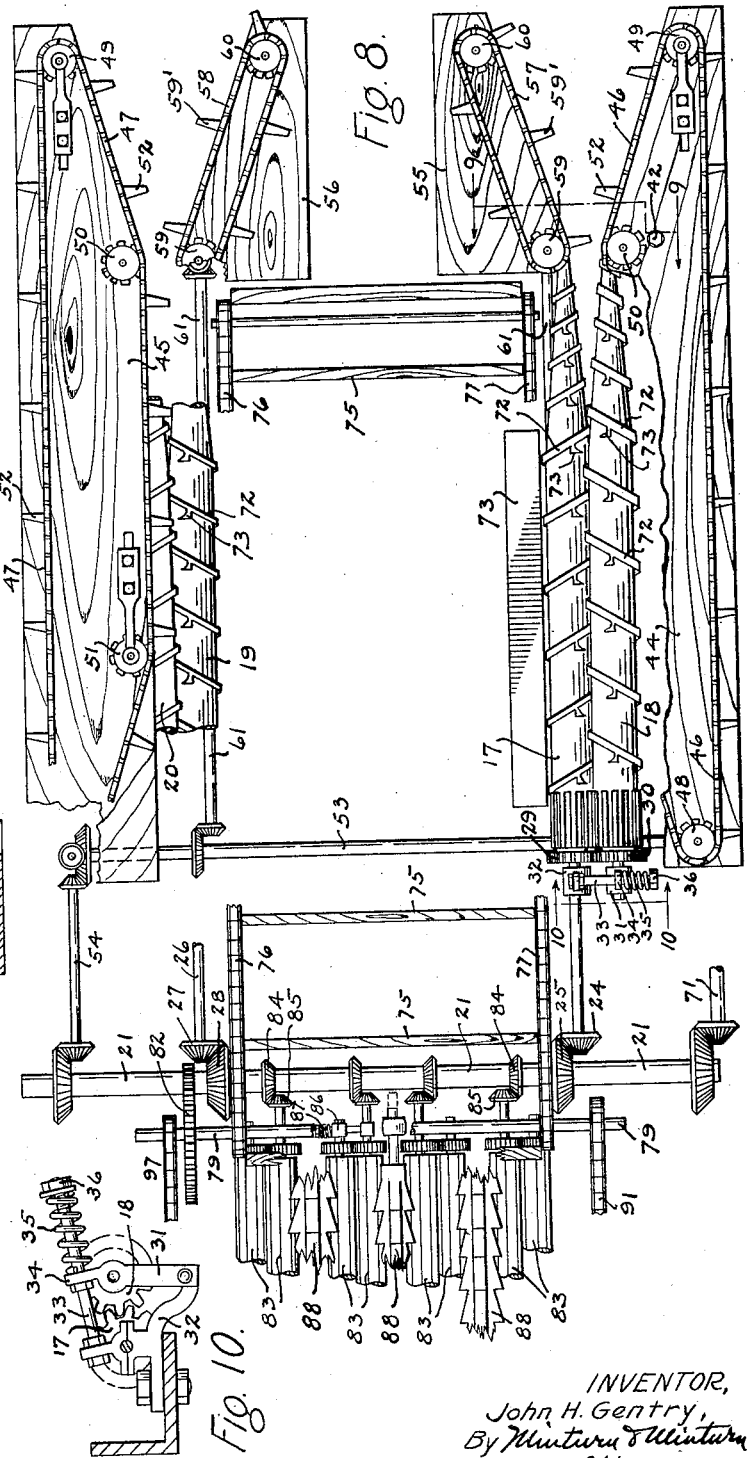

Patented Oct. 11, 1932

1,881,470

UNITED STATES PATENT OFFICE

JOHN H. GENTRY, OF NEAR GREENTOWN, INDIANA

TWO ROW CORN PICKER

Application filed February 18, 1929. Serial No. 340,673.

This invention relates to a corn picker adapted to be moved along rows of corn in a field to snap the ears therefrom, remove the shucks from the ears, and carry the shucked corn away from the picking and shucking mechanism.

My invention provides for picking two rows of corn simultaneously by a compact mechanism embodied in a structure that has been reduced in width considerably from that of the heretofore usual structure so that my picker may be moved readily through the usual farm gates without disturbing any part of the picker. In my structure, the corn is carried in a continuous straight line direction throughout the mechanism until it reaches the discharging conveyer, and the location and arrangement of the various parts permit driving of the moving parts directly from one main transverse shaft, this shaft being driven preferably directly from the tractor unit which is employed to move the picker about the field.

In addition to the primary object of providing an extremely simple structure in a durable and compact form, light in weight, and having a low cost of production, there are many other objects which will be apparent to those versed in the art, such, for example, as means for separating shelled corn from the ear corn, snapping rolls yieldingly adjustable in relation to each other at both ends, means for adjustably withdrawing the gathering chains from the line of the corn stalks, a center box carried well down toward the end of the snapping rollers, and means for positively preventing corn stalks and trash from passing out beyond the upper ends of the snapping rollers to prevent clogging of the mechanism.

The invention is described in reference to the accompanying drawings, in which—

Figure 1:
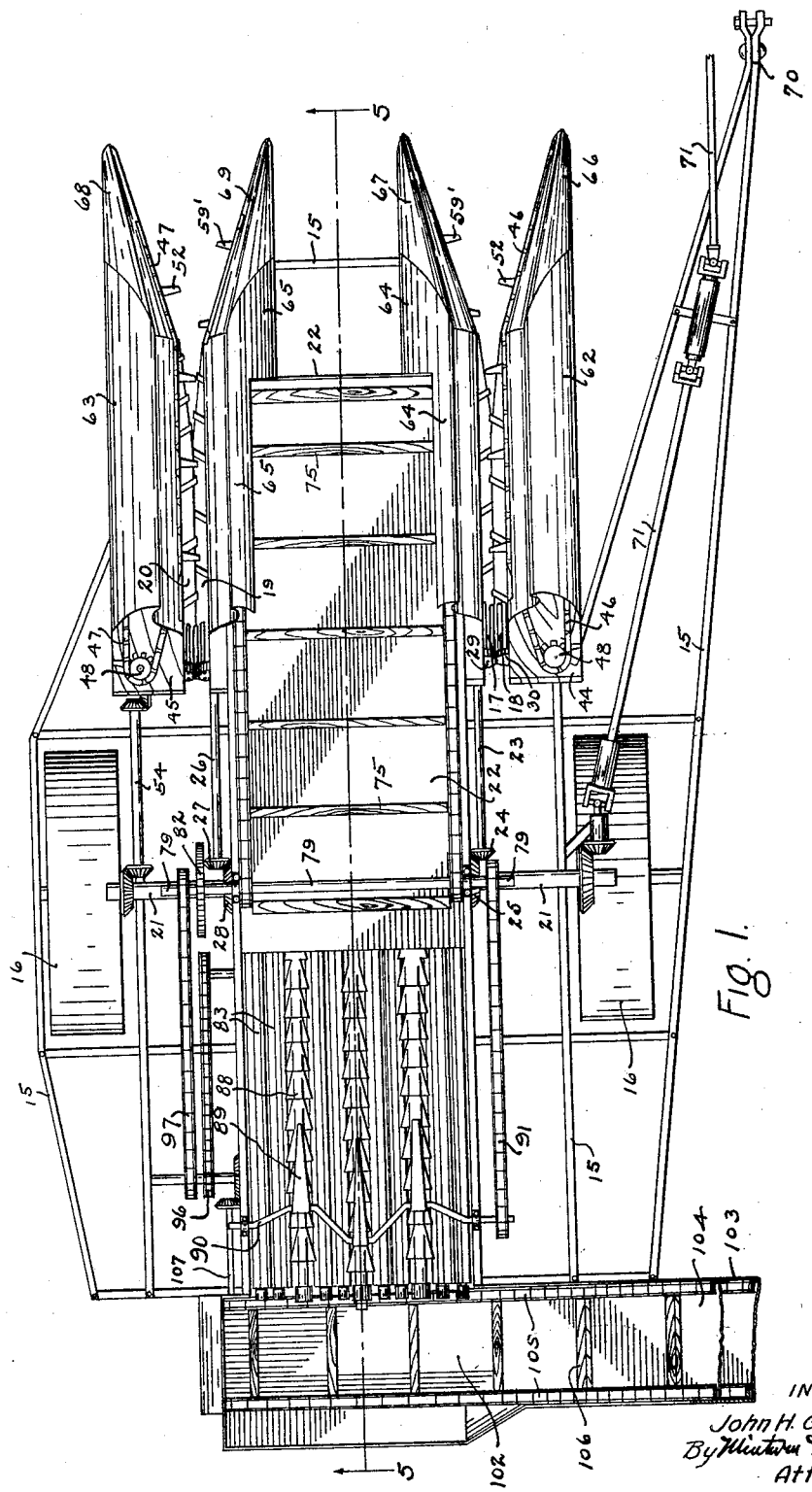
Figure 6:
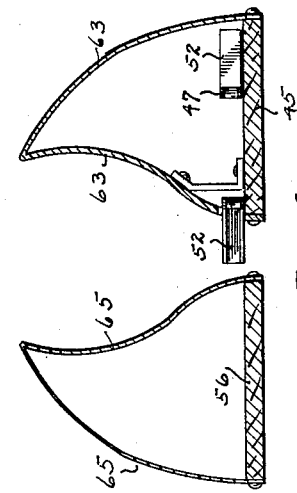
Figure 5:
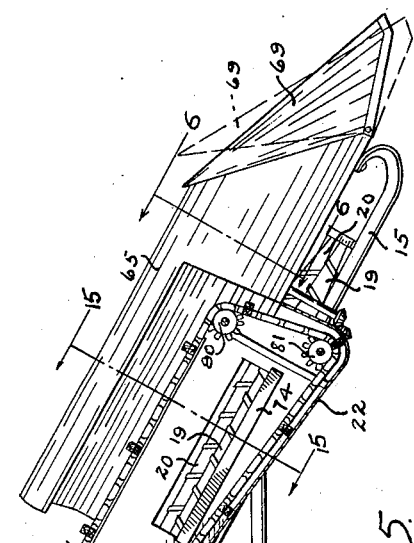
Figure 7:
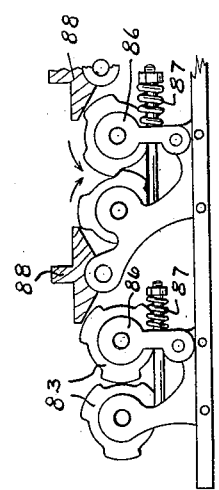

Fig. 1 is a top plan view of a corn picker embodying my invention;
Fig. 2, a left-hand side elevation;
Fig. 3, a right-hand side elevation;
Fig. 4, a rear elevation;
Fig. 5, a longitudinal vertical section on the line 5—5 in Fig. 1;
Fig. 6, a transverse section on the line 6—6 in Fig. 5;
Fig. 7, a detail in rear elevation of the shucking roller adjustment;
Fig. 8, a diagrammatic top plan view of the power transmission;
Fig. 9, a section on the line 9—9 in Fig. 8;
Fig. 10, a section on the line 10—10 in Fig. 8;
Fig. 11, a development on one of the snapping rollers;
Fig. 12, a section on the line 12—12 in Fig. 4;
Fig. 13, a transverse section through a snapping roller on an enlarged scale;
Fig. 14, a transverse section on the line 14—14 in Fig. 3;
Fig. 15, a transverse section on the line 15—15 in Fig. 5; and
Fig. 16, a transverse section on the line 16—16 in Fig. 3, on a slightly enlarged scale.

Like characters of reference indicate like parts throughout the several views in the drawings.

I provide a frame 15 supported on a pair of wheels 16, and on this frame I mount two pairs of snapping rollers 17, 18 and 19, 20 in an inclined relation to the ground, the pairs being spaced apart a distance equivalent to that between two rows of corn. Spaced above and substantially on the center line of the wheels 16, is mounted the main shaft 21 transversely of the frame, and between the pairs of rollers and extending upwardly under the shaft 21 is a box 22 open across its top.

A shaft 23 extends from the roller 17 next to the box and up toward the shaft 21 to be driven therefrom by the bevel gears 24 and 25.

Similarly, a shaft 26 extends from the roller 19 on the other side of the box 22 toward the shaft 21 to be driven therefrom by the gears 27 and 28. It is to be noted, Fig. 8, that these rollers 17 and 19 are each revolved in directions opposite one to the other and in each case away from the box.

Now the other roller 18 is mounted slightly above the roller 17 and is gear driven therefrom by the spur gears 29 and 30. The roller 18 is not rigidly held in relation to the roller 17 but the upper end Fig. 10, is revolvably carried in a bracket 31 which is pivoted to the bracket 32 carrying the upper bearing of the roller 17 so that the roller 18 may swing toward and away from the roller 17. To retain the gears in mesh, a rod 33 fixed by one end on the bracket 32 slidingly passes through an eye 34 on the bracket 31 and carries a compression spring 35 therearound it bearing between the eye 34 and a nut 36 on the outer end of the rod 33, whereby the bracket 31 is normally swung toward the bracket 32 but may yieldingly be swung outwardly by overcoming the pressure of the spring 35, the pressure being determined by adjusting the nut 36 along the rod 34.

The lower end of the roller 18, Fig. 9, is revolvably carried in the arm 37 which extends downwardly to be pivotally carried in the bracket 38 and thence horizontally back under the bracket 38 where a bolt 39 by means of the eye bolt 40 is secured by its lower end thereto. This bolt 39 slidingly passes up through an extension of the bracket 38 and carries around it the compression spring 41 bearing against the extension of the bracket 38 compressively by reason of the nut 42 screw-threadedly carried on the upper end of the bolt 39 as a means of adjusting the compression of the spring 41 thereby determining the degree of pull up on the arm 37 and corresponding rocking of the roller 18 toward the roller 17.

A set screw 43 passes screw-threadedly through the horizontal section of the arm 37 toward the underside of the bracket 38 to serve as an adjustable stop to limit the travel of the lower end of the roller 18 toward the roller 17 but not away from it. The roller 20 is mounted adjustably and yieldingly in relation to the roller 19 in exactly the same manner as above described in reference to the roller 18 and its companion roller 17.

Above the rollers 18 and 20 are mounted the boards 44 and 45 on the respective sides of the box 22 spaced above the rollers in parallel planes thereto with their inner edges substantially in the vertical planes passing through the longitudinal axes of the rollers 18 and 20 respectively. The lower inner edge tapers outwardly to provide a throat into which the standing corn stalks may enter and be guided to between the rollers 17, 18 and 19, 20.

On the top faces of the boards 44 and 45 are carried the outer gathering chains 46 and 47 respectively. Each of these chains, Fig. 8, passes around the upper driving sprocket 48 thence downwardly along the outer edge of its respective board to and around a sprocket 49 and back up the inner tapered edge of the board around a sprocket 50, thence along the straight inner edge of the board to the sprocket 51 and diagonally therefrom across the board back to the driving sprocket 48. At intervals along the chains 46 and 47 are the fingers 52 which extend outwardly from the inner board edges to aid in dragging back the corn stalks to between the rollers.

Since it is not desirable to drag the stalks too far up along the rollers, the fingers 52 are withdrawn from over the rollers by the diagonal travel of the chains 46 and 47 back from the sprockets 51 to the sprockets 48. The sprockets 51 are adjustable longitudinally of the boards so that the point where the fingers 52 are withdrawn may be varied as desired. The lower sprockets 49 are also adjustable longitudinally of the boards so that slack in the chains may be removed by adjustment thereof. The sprockets 48 are driven from the transverse shaft 53 which is in turn driven through the shaft 54 from the main shaft 21.

In the same inclined plane of the boards 44 and 45 are the short boards 55 and 56 above which are mounted the inner gathering chains 57 and 58. The outer edges of these boards 55 and 56 each taper inwardly from the boards 44 and 45 to provide a V-opening therebetween, Fig. 8, and the chains 57 and 58 follow along the outer edges of their respective boards with their fingers 59' extending therefrom into the V-openings. These chains 57 and 58 each pass around the driving sprockets 59 and the idler sprockets 60, the sprockets 59 being driven through the shafts 61 from the transverse shaft 53.

The gathering chains are covered over by the outer shields 62 and 63 and inner shields 64 and 65, the forward ends of the shields terminating in the noses 66, 67, 68, and 69 rockably secured (Fig. 5) whereby they may rock upwardly should obstructions such as mounds of dirt or small rocks be encountered, it being the intention to keep the noses as close as possible to the earth to drag in down corn stalks without causing the noses to dig into the earth.

Particular attention is directed to the formation of the shields, Fig. 6. The outer sides of the shields are convex while the inner opposed sides are concave. By this formation, ears of corn hanging on the stalks which might hang over the shields on the outer sides are easily drawn to between the shields by the rollers pulling in on the stalks and meet substantially no resistance in sliding thereover. Once being between the shields, should a stalk have a tendency to flip its ear of corn sideways or upwardly, the ear would have a tendency to drag and catch over the inwardly directed top edge of the shield and there be held until the stalk is pulled back down between the rollers, whereupon the ear would fall back between the shields.

Referring to Fig. 1, the corn picker is pulled by a rigid draw-bar 70 which extends from one side of the frame 15 and forwardly, to which draw-bar some operating vehicle such as a tractor (not shown) may be hitched so that the picker will follow along behind and over to one side to straddle two rows of corn next adjacent to the left of the line of travel of the tractor. A shaft 71 is carried along on top of the draw-bar to be attached to the tractor in the usual manner well known to those versed in the art. This shaft by suitable bevel gears revolves the main shaft 21.

As the picker is pulled along, it is guided so that the corn stalks are passed normally into the V-openings between the noses 66, 67, and 68, 69, and the gathering chains by their projecting fingers pull the stalks back between the rollers 17, 18 and 19, 20.

Since in each pair of the rollers, the rollers are revolving toward each other, as viewed from their top sides the stalks are carried downwardly therebetween, the spring tension on the outer roller in each pair, as above described, being sufficient to cause the rollers to grip and positively drag the stalks downwardly therebetween. Reference to Figs. 8, 11 and 13 will show each of the rollers 17, 18, 19 and 20 to have a raised spiral band therearound from which band 72 projects a number of hooks 73 along on the face of the roller, the spiral of each band being reversed on each roller in each pair, the resultant action in each pair being an upwardly conveying action longitudinally of the rollers. Now as the stalk is pulled between the rollers until an ear on the stalk is reached, the ear, being much larger in diameter and firmer than the stalk does not pass between the rollers but is snapped off the stalk, and by reason of the outer rollers 18 and 20 being somewhat above the inner rollers 17 and 19 and also by reason of the rollers 18 and 20 revolving around and toward the box 22, the ears drop on and are kicked thereby away from the rollers over aprons 73 and 74 into the central box 22, with the principal portion of the shucks remaining thereon.

The bottom of this box 22 is below the aprons 73 and 74, and the corn falling thereon is carried upwardly and rearwardly by a conveyor formed of transverse slats 75 carried by the chains 76 and 77 which drag the slats 75 up along over the floor of the box 22, thence pass around the sprockets 78 on the shaft 79 and around down to the sprockets 80 at the lower upper end of the box 22, down to the lower sprockets 81 and back up over the floor, Fig. 5. The shaft 79 is driven by the spur gears 82 from the main shaft 21.

From the top end of the floor of the box 22, the ears of corn slide by gravity down backwardly over the shucking rolls 83 which are arranged in a plurality of pairs, one roll in each pair being driven by bevel gears 84 and 85 from the shaft 21 and the other roll being spur gear driven from the first roll in that pair. The spur gear driven roll in each pair is held in yielding contact with the other roll by means of the yielding roll being carried in rocking brackets 86 (Fig. 7) at each end carried toward the other roll by means of an adjustable compression spring 87.

An agitator bar 88 is carried between each adjacent pair of rolls 83 and is reciprocated longitudinally of the rolls by the connecting rod 89 actuated from the crankshaft 90 which is revolved through the chain 91 from the shaft 79, Fig. 1. The rolls 83 and bars 88 are sloped downwardly from the upper end of the floor of the box 22, so that the reciprocating action of the bars 88 tend to keep the ears of corn parallel to the rolls 83 and work the ears on down along the rolls. The rolls 83 pull the shucks off the corn, leaving the shucked ears on top the rolls and carrying the shucks through between the rolls. Occasionally under certain conditions of the corn, some grains will be shelled from the ear by the rolls 83. Such shelled corn passes in part through between the rolls 83 and the balance on down along the rolls to be discharged along with the ear corn into the receiving box 102 below and under the ends of the rolls 83, Fig. 5.

An inclined floor 92 is placed under the rolls 83, Figs. 5 and 14 onto which the shucks and shelled corn drop. A chain 94 at each side of the floor 92 driven by the sprockets 95 by the chains 96 and 97 from the shaft 79, carries the slats 98 therebetween and along upwardly over this floor 92 to carry the shucks forwardly and discharge them to drop onto the ground.

The floor 92 is perforated so that the grains of corn may drop through the holes as the slats move thereover down onto a second floor 99 over which the slats 98 are dragged rearwardly as the chains 94 return from the sprockets 95 down under the sprockets 100 and back over the sprockets 101 to the sprockets 95. The floor 99 is also perforated, but the holes therethrough will permit dirt to drop out but are too small to receive the grains of corn. The shelled corn is thus carried on back to be discharged into the box 102. It is thus to be seen that the corn has been moved in a straight line direction always parallel to the line of travel of the picker and always to its rear from the time the corn stalk was encountered until the shucked ear was deposited at the rear.

From the righthand side of the box 102 extends a chute 103 in an upwardly and outwardly inclined position. The box 102 carries a transverse horizontal partition 104, Figs. 4, and 5, spaced above its floor and this partition extends around and up into the chute 103 for a substantial distance. Means for moving the corn along over the partition 104 are provided by a pair of chains 105 spaced apart by the slats 106 therebetween, the chains being driven by the sprockets 107 which are driven by the shaft 108, Figs. 1, and 5 through the chain 97 from the shaft 79. The slats 106 are moved over the top side of the partition and up the chute to drag the ear and shelled corn therealong up and out the top end of the chute, the slats being returned back along under the partition. A wagon, not shown, may be driven along or fixed to the pulling tractor in the usual manner to receive the corn discharging from the chute.

The chute 103 is provided with a means for separating the shelled corn from the ear corn. At a suitable distance up the chute, Fig. 4, the partition 104 is perforated such that the grains of corn may normally fall therethrough. A plate 108 is slidingly mounted under the perforated part of the partition, Figs. 4 and 12, to be moved therealong by the lever 110 so as to cover and uncover the perforations as desired. The wall of the chute immediately under the perforations is removed and a deflector 109 is provided therearound to the under side of which a bag, not shown, may be swung to receive the shelled corn when the perforations are uncovered. The chute 103 is hinged so that it may be folded back over the box 102 when the picker is not in use and is being moved through gates and the like.

Particular attention is directed to the means provided to prevent stalks and trash from accumulating at the upper ends of the snapping rollers which action has heretofore been such a serious problem as to prevent universal acceptance of a corn picker as a continuously operated device. Reference is made especially to Figs. 3, 8 and 16 wherein the upper ends of the snapping rolls 17, 18, 19, and 20 are shown as being provided with their upper ends swelled out over a substantial length to approximately the same diameter as that of the spirals 72, and longitudinal grooves are formed in these enlarged ends to create the ridges or teeth 110, the outside circles of which are normally tangent, but the teeth on one roll are spaced ahead of the teeth on the companion roll so that, as a stalk 111 which has slipped past the spirals 72 without being pulled down therebetween, strikes the teeth it may pass therebetween in the same manner straw board does between the corrugating rolls in the art of making corrugated straw-board with the result that the stalk is positively gripped and pulled down between the teeth, all stalks and trash reaching the teeth 110 thus being forcibly ejected before it reaches the gears 29 and 30.

The yielding action of the rolls relative to each other in each provides for stalks of varying diameters and hardness so that there is no danger of breaking the teeth 110.

I claim:

1. In a corn picker, a central upwardly and rearwardly inclined corn conveyor, a pair of snapping rolls on each side of said conveyor, the outer roll in each of said pairs being mounted somewhat higher than the inner roll of that pair, a wall extending concavely upwardly on each side of each pair of snapping rolls whereby the top edges of the walls in each pair are directed toward each other, and an apron extending outwardly and around downwardly from each of the top edges of said walls presenting convex surfaces thereby.

2. In a corn picker, a main transverse drive shaft, a snapping roll having its axis intersecting the axis of the shaft, and a separate shucking roll having its axis intersecting said shaft, said rolls having their respective axes sloping downwardly from said transverse shaft on each side thereof in opposite directions.

3. In a corn picker, a main transverse drive shaft, a snapping roll having its axis intersecting the axis of the shaft, and a separate shucking roll having its axis intersecting said shaft, both of said rolls being directly gear-driven from said shaft and positioned at an obtuse angle one to the other to have said shaft at the vertex of said angle.

4. In a corn picker, a gathering chain, front and rear sprockets about which the chain passes, an idler sprocket offset from the line of said front and rear sprockets to carry said chain outwardly from said line, means for adjusting the position of said idler, and means for adjusting one of said first sprockets to compensate for the adjustment of said idler sprocket.

5. In a corn picker, a snapping roll, a gathering chain in proximity to the roll, front and rear sprockets about which the chain passes, front and rear idling sprockets carrying a portion of the chain substantially parallel to the axis of said roll, and means for variably fixing the length of said parallel portion of chain.

6. In a corn picker, a snapping roll, a gathering chain, front and rear sprockets about which the chain passes, said two sprockets being removed laterally from the axis of the roll, a forward sprocket near the lower end of the roll directing the chain angularly from the front sprocket toward said roll, a fourth sprocket spaced rearwardly from said forward sprocket and near said roll to receive said chain from said forward sprocket on a line substantially parallel to said roll, and means for adjusting said fourth sprocket whereby said chain may be returned to said rear sprocket from around the fourth sprocket at varying distances from said forward sprocket.

7. In a corn picker, a snapping roll, a gathering chain, front and rear sprockets about which the chain passes, said two sprockets being removed laterally from the axis of the roll, a forward sprocket near the lower end of the roll directing the chain angularly from the front sprocket toward said roll, a fourth sprocket spaced rearwardly from said forward sprocket and near said roll to receive said chain from said forward sprocket on a line substantially parallel to said roll, and means for adjusting said fourth sprocket whereby said chain may be returned to said rear sprocket from around the fourth sprocket at varying distances from said forward sprocket, and means for adjusting said front sprocket to compensate for adjustments of said fourth sprocket.

8. In a corn picker, a snapping roll, a gathering chain in proximity to the roll, front and rear sprockets about which the chain passes, front and rear idling sprockets carrying a portion of the chain substantially parallel to the axis of said roll, and means for variably fixing the length of said parallel portion of chain, and a shield above said chain and roll having a convex outer surface and a concave inner surface.

9. In a corn picker, a main transverse driving shaft, a plurality of shucking rolls sloping downwardly and rearwardly from the shaft and directly gear driven therefrom, a pair of snapping rolls sloping downwardly and forwardly from the shaft and directly gear driven therefrom, and a corn conveyor adjacent said snapping rolls sloping upwardly along side thereof and discharging over said shaft down onto said shucking rolls.

In testimony whereof I affix my signature.

JOHN H. GENTRY.